US012088742B2

(12) United States Patent
Dai et al.

(10) Patent No.: US 12,088,742 B2
(45) Date of Patent: Sep. 10, 2024

(54) ANTI-TRAPDOOR-LEAKAGE ON-CHAIN DATA RESTORATION SYSTEM AND METHOD THEREOF

(71) Applicant: Huazhong University of Science and Technology, Hubei (CN)

(72) Inventors: Weiqi Dai, Wuhan (CN); Jinkai Liu, Wuhan (CN); Hai Jin, Wuhan (CN); Deqing Zou, Wuhan (CN)

(73) Assignee: HUAZHONG UNIVERSITY OF SCIENCE AND TECHNOLOGY, Wuhan (CN)

( * ) Notice: Subject to any disclaimer, the term of this patent is extended or adjusted under 35 U.S.C. 154(b) by 291 days.

(21) Appl. No.: 17/664,767

(22) Filed: May 24, 2022

(65) Prior Publication Data

US 2023/0085807 A1    Mar. 23, 2023

(30) Foreign Application Priority Data

Sep. 17, 2021   (CN) .......................... 202111095528.8

(51) Int. Cl.
| | |
|---|---|
| *H04L 9/00* | (2022.01) |
| *H04L 9/08* | (2006.01) |
| *H04L 9/32* | (2006.01) |

(52) U.S. Cl.
CPC .............. *H04L 9/50* (2022.05); *H04L 9/0819* (2013.01); *H04L 9/3236* (2013.01)

(58) Field of Classification Search
CPC ....... H04L 9/50; H04L 9/0819; H04L 9/3236; H04L 9/0891; H04L 9/0861;
(Continued)

(56) References Cited

U.S. PATENT DOCUMENTS

| | | |
|---|---|---|
| 2019/0073146 A1 | 3/2019 | Ateniese et al. |
| 2019/0379664 A1* | 12/2019 | Suthar .................. H04L 9/3239 |

(Continued)

FOREIGN PATENT DOCUMENTS

| | | |
|---|---|---|
| CN | 110086631 | 8/2019 |
| CN | 111357240 | 6/2020 |

(Continued)

OTHER PUBLICATIONS

Chinese Office Action mailed May 12, 2022 in corresponding Chinese Application No. 202111095528.8. No English translation.

*Primary Examiner* — Henry Tsang
(74) *Attorney, Agent, or Firm* — Michael Ye; Kalos Athena Wang PLLC

(57) ABSTRACT

The present invention provides an anti-trapdoor-leakage on-chain data restoration system, at least comprising: a blockchain node, for broadcasting transaction data of a request-initiating person to blockchain nodes and proposer nodes in other groups, respectively; and a proposer node, for performing computation of a Chameleon-Hash function using a key set that is generated by a key-generating module provided in the proposer node, packaging the transaction data to generate a new block, and distributing the new block to all the blockchain nodes so that the blockchain nodes update their respective underlying ledgers according to the new blocks broadcasted by the proposer. The system of the present invention not only realizes such functions as restoration and editing of the transaction data, but also protects operational security and reliability of blockchains.

3 Claims, 4 Drawing Sheets

(58) Field of Classification Search
CPC ............... H04L 9/3242; H04L 67/1095; H04L 2209/463; G06F 16/22; G06F 16/2358; G06F 16/27; G06Q 40/04
See application file for complete search history.

(56) References Cited

U.S. PATENT DOCUMENTS

2020/0201964 A1* 6/2020 Nandakumar ...... H04L 63/0861
2023/0073337 A1* 3/2023 Chan ..................... H04L 9/3239

FOREIGN PATENT DOCUMENTS

| CN | 111639935 | | 9/2020 | |
|----|-----------|---|--------|---|
| CN | 111641712 A | * | 9/2020 | ............. G06Q 40/04 |
| CN | 112437069 | | 3/2021 | |

* cited by examiner

ANTI-TRAPDOOR-LEAKAGE ON-CHAIN DATA RESTORATION SYSTEM AND METHOD THEREOF

This application claims the benefit of the Chinese Patent Applications No. CN 202111095528.8 filed on Sep. 17, 2021, which is hereby incorporated by reference as if fully set forth herein.

BACKGROUND OF THE INVENTION

1. Technical Field

The present invention relates to blockchain technology, and more particularly to an anti-trapdoor-leakage on-chain data restoration system and method thereof.

2. Description of Related Art

As a decentralized, tamper-resistant, traceable, distributed ledger system, blockchains have been extensively applied in various fields in our world. The core of its concept is about transforming a centralized accounting model into a distributed ledger that all participants jointly take a backup of it, wherein the tamper resistance and security of the ledger can be enhanced as it is supervised by every participant. Currently, leading banks have built their respective platforms for blockchain transactions, and the platforms are used in real-world production transactions. The purpose is to build a blockchain transaction platform where data of various types of transactions can be processed in an open and transparent manner, while content control featuring traceability and tamper resistance can be realized. However, there are two sides to every door. While the tamper-resistant nature of blockchains secures data of distributed ledgers, it poses daunting challenges on management of on-chain contents of blocks. In the decade witnessing the development of the blockchain technology, strong increase of data has brought about a huge demand for storage. Meanwhile, errors ascribed to human operation is unavoidable in bank transactions like money transfer, and if the transaction system does not allow timely correction, the financial loss can be enormous. These properties make the existing blockchain systems suffer from many realistic problems.

A ledger database only allows addition and queries and does not accept required modification. This is because on one hand since contents of transactions are fully mapped to the Merkle root, a local tampering action of a transaction will not be recognized by other nodes, and on the other hand, since blockchains are ordered, any on-chain block is unchangeable or the order will be broken. However, for information-storing applications, a need of modification always happens, such as when transaction contents or the amounts of money have been changed, or when an on-chain block contains illegal information or has to be revoked by accident. Hence, the concept of editable blockchains has been proposed by some researchers. Currently, blockchain modification is made as described below. First, an editable blockchain is such designed using the Chameleon-Hash function. The point of design is to create a backdoor for modification by changing the existing hash structure without altering the data structure of the blockchain. Particularly, the hash function linking blocks is replaced by a Chameleon-Hash function. For example, an article titled "Redactable Blockchain-or-Rewriting History in Bitcoin and Friends" published by Ateniese et al in 2016 proposed editable blockchains. This technology is based on a Chameleon-Hash function, and allows contents of problematic blocks (such as illegal information or contents related to illegal transactions) to be re-edited while keeping the hash value of the block unchanged, thereby ensuring secure and reliable operation of blockchains.

Chameleon Hash is a hash function entered as a specific structure, which allows the existence of a trapdoor. A trapdoor is also known as a backdoor. A party having knowledge of the trapdoor information can construct input data so as to have the input changed but leave the output of the hash function unchanged. This makes the hash function not collision-resistant. In other words, with a given m and a given Hc(m), m' can be found rapidly, so that Hc(m)=Hc(m'). Chameleon Hash is a one-way hash function with a trapdoor. People holding the trapdoor information can easily figure out a collision of random input through computation, while people lacking the trapdoor information are unable to correctly compute collisions. Nevertheless, key management is an issue to be address when the Chameleon-Hash function structure is applied to editable blockchains in practical applications. To be specific, trapdoor keys can be centrally stored in an entity, with the reliability depending on trustability and security protection of a user holding a trapdoor key. For preventing excessive concentration of permission, trapdoor keys are stored in a distributed way. However, since users may perform differently in terms of security protection, some secret shares can be vulnerable to attacks and theft. According to the initial Chameleon-Hash function scheme, if a designated recipient uses his/her private key to alter the Chameleon-Hash value of a message m into the hash value of a message m', the same Chameleon-Hash value will correspond to two preimages. However, the private key of the designated recipient can be figured out from the two preimage values. This feature of the Chameleon-Hash function is called trapdoor (key) leakage.

In the prior art, China Patent Application Publication No. CN110086631B discloses a method capable of updating chameleon hash functions, which comprises: initializing a system, generating a key, calculating a hash, verifying the hash, calculating collision, updating collision, periodically updating the chameleon random number meeting the collision according to a trapdoor key, and authenticating the correctly updated chameleon random number in the current time point, otherwise, failing to pass authentication, so as to solve the problems of efficiency and safety of the Chameleon-Hash value of the Chameleon-Hash function in the prior art. The method is suitable for safely and efficiently calculating the chameleon hash value, can resist key leakage, can periodically update the chameleon random number meeting the collision, prevents the collision value from being abused, and simultaneously improves the freshness of the chameleon hash value.

While many existing studies are focused on how to prevent exposure of keys as described previously, the solutions proposed by them are all related to the computation efficiency and security of the Chameleon-Hash function itself. If the Chameleon-Hash function mentioned in these solutions is simply applied to a blockchain system, the effect is nothing more than the ability to modify transaction data of blocks, and the operation of modifying blocks itself is left unsupervised and unaudited, making blockchain security unprotected. Meanwhile, once the original transaction data on blocks are modified, the modification cannot be undone, so the existing solutions are far from satisfying in terms of practicality.

Further, since there is certainly discrepancy between the prior art comprehended by the applicant of this patent application and that known by the patent examiners and since there are many details and disclosures disclosed in literatures and patent documents that have been referred by the applicant during creation of the present invention not exhaustively recited here, it is to be noted that the present invention shall actually include technical features of all of these prior-art works, and the applicant reserves the right to supplement the application with technical features known in the art as support.

SUMMARY OF THE INVENTION

The existing researches have been mainly focused on how to not expose keys, such as the method disclosed in China Patent Application Publication No. CN110086631B. However, the known solutions are all related to the computation efficiency and security of a Chameleon-Hash function itself. If the Chameleon-Hash function mentioned in these solutions is simply applied to a blockchain system, the effect is nothing more than the ability to modify transaction data of blocks, and the operation of modifying blocks itself is left unsupervised and unaudited, making blockchain security unprotected. Meanwhile, once the original transaction data on blocks are modified, they cannot be restored, so the existing solutions are far from satisfying in terms of practicality. To address the foregoing shortcomings, the present invention provides an auditable, supervisable, anti-trapdoor-leakage on-chain data restoration system. The system of the present invention not only realizes such functions as restoration and editing proposed in the existing researches, but also protects operational security and reliability of blockchains by changing blockchain ledgers from the form of singly-linked lists into the form of two-way chain tables, so that transaction data of blocks before and after modification can be both kept in the underlying ledger. Keeping pre-modification data does not affect restoration of on-chain data, but, on the contrary, makes restoration of on-chain data auditable and supervisable, thereby allowing supervisors to verify every on-chain data modification. Additionally, the present invention can at the system mechanism level effectively prevent risks brought about by exposure of the trapdoor of the Chameleon-Hash function. Even if the trapdoor is exposed, security of the system can remain intact. As compared to the known editable blockchain systems as discussed in the prior researches, the system of the present invention can use any Chameleon-Hash function as the Chameleon-Hash function of the system, and is therefore more advantageous than the prior-art systems in terms of both performance and applicability.

The present invention provides an anti-trapdoor-leakage on-chain data restoration system, at least comprising: a blockchain node, for broadcasting transaction data of a request-initiating person to blockchain nodes and proposer nodes in other groups, respectively; and a proposer node, for performing computation of a Chameleon-Hash function using a key set that is generated by a key-generating module provided in the proposer node, packaging the transaction data to generate a new block, and distributing the new block to all the blockchain nodes so that the blockchain nodes update their respective underlying ledgers according to the new blocks broadcasted by the proposer.

According to a preferred embodiment, every said block in the underlying ledger that has been updated by the blockchain node has a block head including index records about a previous block and a next block with respect to that block, so as to enable the blockchain node to confirm data of the previous block and/or the next block with respect to that block through that block.

According to a preferred embodiment, wherein the blockchain node at least comprises a data processing device, which is configured to: according to a type of the block, determine whether a transaction initiated by a request-initiating person satisfies preset restoration conditions; based on the determination result, call a relevant processing contract; and according to the processing contract, restore or synchronize the data based on consensus reached through a multi-organization vote and insertion of the new block.

Preferably, the request-initiating person or organization calls the contract when making a restoration request. Before a block is generated, the request-initiating person or organization makes a restoration request by calling the contract. Afterward, the blockchain node or the client calls the contract through a second call. Specifically, the blockchain node or the client determines whether the transaction initiated by the request-initiating person satisfies the preset restoration conditions according to the block type. Then the corresponding processing contract is called based on the determination result. According to the processing contract, the consensus reached through a multi-organization vote is passed and sequentially an instruction is generated based on the result of consensus reached through a multi-organization vote. The instruction may be an entry of transaction data. The proposer receiving the instruction can identify the corresponding block and modify it. The modified result is then broadcasted to blockchain nodes. Herein, a modification operation can refer to operation of performing computation of a Chameleon-Hash function with the key set generated by a key-generating module provided in its node, packaging the transaction data, and generating a block. The blockchain node can modify and update the underlying ledger data according to the broadcasted information it receives.

According to a preferred embodiment, the proposer node modifies a hash of the previous block recorded in the old block confirmed according to the transaction data, through the computation of the Chameleon-Hash function.

According to a preferred embodiment, after the computation of the Chameleon-Hash function, the hash of the previous block recorded in the old block remains unchanged, and the old block is marked as invalid but kept in the underlying ledger with its original capability of linking blockchains intact, after the blockchain node inserts the new block to the underlying ledger.

According to a preferred embodiment, when inserting the new block, the blockchain node updates the index records about the old block contained in the blocks before and after the old block. Through the update operation, in a doubly-linked list, when a new block is inserted between two blocks, the index of the immediately following block contained in the previous block of the old block and the index of the immediately preceding block contained in the next block after the old block are to be updated.

According to a preferred embodiment, a trapdoor corresponding to the new block generated by the proposer node is different from a trapdoor of the old block identified by the tx_id of the transaction.

According to a preferred embodiment, the data processing device is further configured to: according to the called processing contract, search for the relevant transaction so as to acquire a tx_id of the transaction; based on the acquired tx_id, search for the relevant old block; and search for the proposer node relevant to the old block and make the proposer node generate the new block.

The present invention further discloses an anti-trapdoor-leakage on-chain data restoration method, at least comprising: broadcasting transaction data of a request-initiating person to blockchain nodes and proposer nodes in other groups by a blockchain node, respectively; packaging the transaction data to generate a new block by the proposer node; performing computation of a Chameleon-Hash function by a proposer node using a key set that is generated by a key-generating module provided in the proposer node; distributing the new block to all the blockchain nodes by the proposer node; and making the blockchain nodes update their respective underlying ledgers according to the new blocks broadcasted by the proposer.

According to a preferred embodiment, further comprising: according to a type of the block, determining by the blockchain node whether a transaction initiated by a request-initiating person satisfies preset restoration conditions; based on the determination result, calling a relevant processing contract by the blockchain node; and according to the processing contract, restoring or synchronizing the data by the blockchain node, based on consensus reached through a multi-organization vote and insertion of the new block.

According to a preferred embodiment, further comprising: forming an index of the replacement block by using the tx_id of the cross-domain transaction; and sorting the old transactions of the new organization with the same index and inserting it into the existing blockchain.

DETAILED DESCRIPTION OF THE INVENTION

Figure 1:
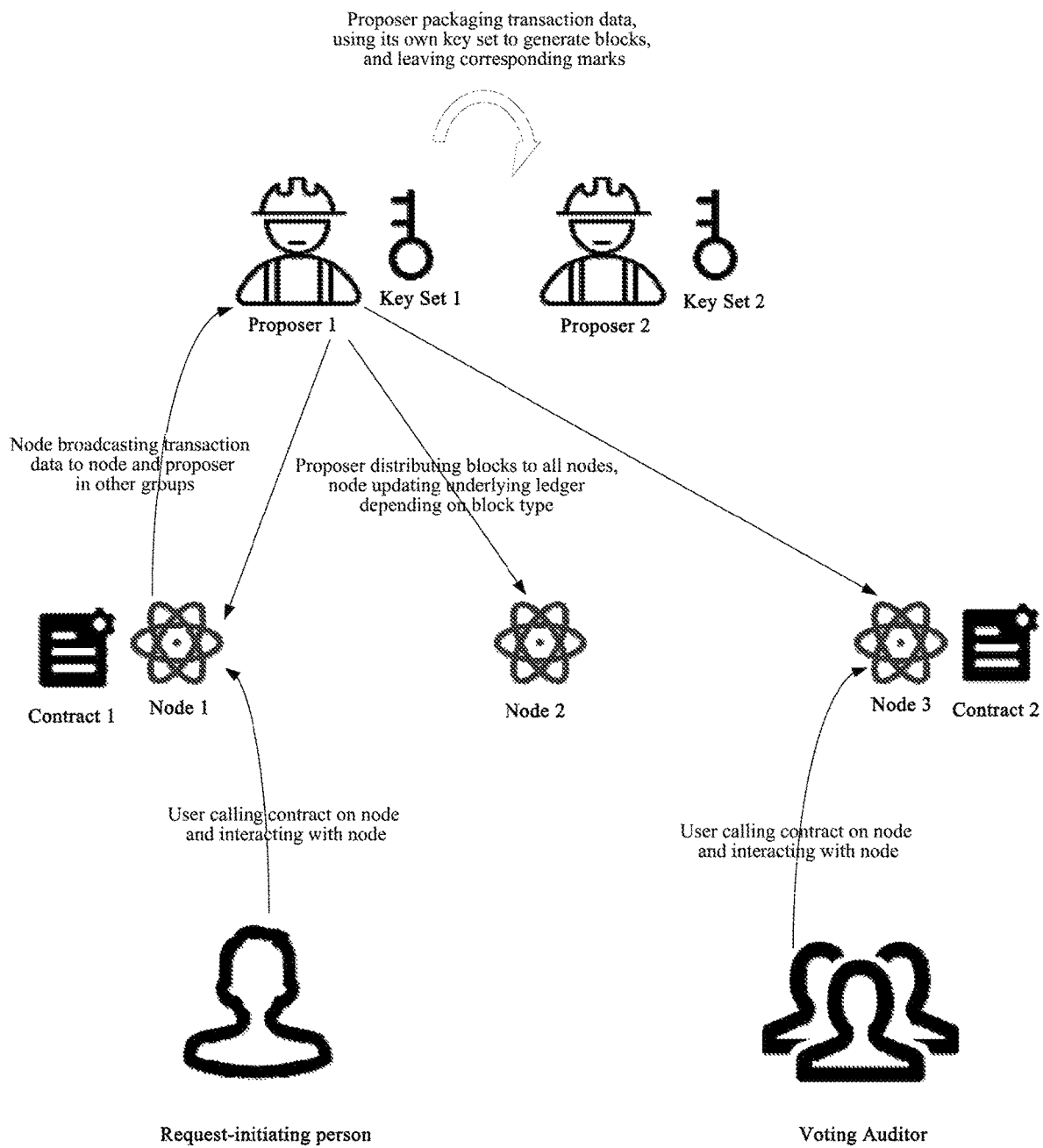
FIG. 1 is a schematic structural diagram of an on-chain data restoration system disclosed in the present invention.

In order to make the objectives, technical solutions and advantages of the present invention clearer, the present invention will be further described in detail below with reference to the accompanying drawings and embodiments. It should be understood that the specific embodiments described herein are only used to explain but not to limit the present invention. In addition, the technical features involved in the various embodiments of the present invention described below can be combined with each other, provided that there is no mutual conflict.

For ease of understanding, technical terms of the present invention are explained as follows.

The term "tx_id" refers to a transaction ID, also known as TxHash, or transaction hash. It is similar to a package tracking number in that every package trusted to express delivery has a unique package tracking number, and similarly, every entry of transaction data published to a blockchain has a unique incorruptible transaction ID, through which all information related to the transaction can be recovered.

A trapdoor function, or a one-way trapdoor function, represents an important concept in cryptography, and it can be briefly described as a function that is easy to compute in one direction, yet difficult to compute in the opposite direction. Different from the "irreversibility" of a one-way function, a one-way trapdoor function is actually reversable with a known "trapdoor." When the trapdoor is unknown, the function is just a normal one-way function. With the information of its trapdoor, it can be computed in the reverse direction. The trapdoor one-way function f(x) is a function having the following qualities: (1) for any x belonging to f domain of definition, $y=f(x)$ can be computed in the polynomial time; (2) for any y belonging to f range of value, x cannot be figured out in the polynomial time so that $x=f^{-1}(y)$; (3) when k is known, for any y belonging to f range of value, $x=f_k^{-1}(y)$ can be computed in the polynomial time, where k is the trapdoor of the trapdoor one-way function.

A hash function refers to a function that can convert an input string of an arbitrary length into a string of a fixed length. The converted string can be easily figured out using the original string, yet it is difficult to recover the original string from the converted string. If a hash function is weak collision-resistant, for a message x, it is computationally infeasible to figure out a y satisfying $y \neq x$ and $H(x)=H(y)$. If a hash function is strong collision-resistant, it is computationally infeasible to figure out any pair (x, y) satisfying $H(x)=H(y)$.

The phrase "transactions being out-of-order" primarily means that at least some transactions in the block of interest are not arranged in order.

An editable blockchain refers to any blockchain on which data can be added, deleted, and modified.

A two-way chain table is also known as a doubly-linked list, being a kind of link tables. Every data node in the table has two pointers pointed to its directly successor and directly precursor, respectively. This, from any node in a two-way chain table, its precursor node and successive node can be accessed conveniently. By contrast, in a singly-linked list, every node only includes one pointer (cursor), and every pointer is pointed to the directly successive node. The only difference between a singly-linked list and a doubly-linked list is that every node in the latter has one additional pointer domain pointed to the direct precursor. Different from creating a singly-linked list, to create a two-way chain table, every new node has to be linked to its precursor node twice for pointing the prior pointer of the new node to the directly precursor node, and pointing the next pointer of the direct precursor node to the new node. On this basis, the two-way chain table blockchain provided by the present invention may mean that in the ledger maintained by a blockchain system, the block head of every block has index records the of the previous block and the next block of that block. The index record may be a block number and/or a location where the block is stored, so as to achieve two-way access in which from a certain block, data of its previous block and next block can be accessed easily.

With the use of editable blockchains, the on-chain data restoration method and system of the present invention creates an anti-trapdoor-leakage on-chain data restoration mechanism that is auditable, thereby solving problems of the existing blockchain systems about restoring on-chain data. The system of the present invention can consistency of on-chain an off-chain data. According to the present invention, every time data restoration or synchronization is performed, audit and insertion of new blocks are conducted. The inserted new blocks inherit the usable data of the old blocks and logically invalid the old blocks. This ensures that restoration can be realized without risks of key exposure even if the simplest Chameleon-Hash function is used and with the restoration auditable.

The anti-trapdoor-leakage on-chain data restoration system comprises request-initiating persons, voting auditors, at least one blockchain node, proposer nodes, and a data processing device provided in the blockchain node.

The request-initiating person (organization) and the voting auditors can both make information interaction with the blockchain node and call contracts on the blockchain node.

The blockchain node (or a client) is used to broadcast transaction data of the request-initiating person to other blockchain nodes and a proposer node group. The proposer node is provided with a key-generating module for generating a key set necessary for the computation of the Chameleon-Hash function.

The proposer nodes (or proposers) perform computation of the Chameleon-Hash function using a key set generated by a key-generating module. The proposer nodes package the transaction data that have undergone the foregoing computation of the Chameleon-Hash function and generate blocks accordingly. The proposer nodes distribute the generated new blocks to all blockchain nodes.

The blockchain node updates the corresponding underlying ledger according to the new block broadcasted by the proposer. The blockchain nodes do not participate in the hash computation.

The blockchain node at least comprises a data processing device. The data processing device is used to process data at the contract level, so as to allow user to call the contracts and complete transactions.

The data processing device comprises at least a module. Therein, a first module is configured to determining whether an initiated transaction satisfies conditions for sorting and restoration. A second module is configured to determine whether the initiated transaction satisfies conditions for data restoration. A third module is configured to call the corresponding processing contract according to the determination result. A fourth module is configured to perform consensus reached through a multi-organization vote according to the processing contract. A fifth module is configured to determine whether the initiated transaction satisfies preset conditions for voting according to a voting statistic result. A sixth module is configured to restore or synchronize data by inserting new blocks according to the processing contract.

The data processing device may further comprise a public and private key generating module, which is used to ensure availability and security of the system. With the public and private key generating module, it is ensured that only the proposer can use critical information.

The data processing device may further comprise a block structure constructing module, which is used to implement a block structure and the corresponding Merkle tree supporting the data restoration mechanism in the blockchain node, thereby supporting the data restoration function of the system.

The data processing device may further comprise a block head information synchronization module, which is used to find the longest chain from the blockchain node and acquire information of the block head from the longest chain.

Preferably, the data processing device of the present invention can be, for example, a computer, a server, as well as other devices or systems adopting an anti-trapdoor-leakage on-chain data restoration system or method thereof. According to an embodiment of the present invention, besides the first to sixth modules, the data processing device may further include other components such as a central processing unit, a communication unit, a storage unit, and an I/O unit. The first to sixth modules are connected with the central processing unit, respectively, and all perform information exchange with it. For example, general-purpose processors, digital signal processors (DSPs), application specific integrated circuits (ASICs), field programmable gate arrays (FPGAs) or other programmable logic devices, discrete gate or transistor logic, discrete hardware components or any combination thereof for performing the functions described herein can be used to implement or execute the various exemplary logical blocks, modules, and circuits described according to the present disclosure. A general-purpose processor may be a microprocessor, or, alternatively, any common processor, controller, microcontroller, or state machine. A processor may also be implemented as a combination of computing devices, e.g., a combination of a DSP and a microprocessor, a combination of multiple microprocessors, a combination of one or more microprocessors and a DSP core, or any other such configuration. Exemplarily, embodiments of the present disclosure may be described in the context of machine-executable instructions, such as those included in program modules executed by the components on a real or virtual target processor. Generally, program modules include routines, programs, libraries, objects, classes, components, data structures, etc., that perform particular tasks or implement particular abstract data structures. In various embodiments, the functionality of the program modules can be combined or divided among them. Machine-executable instructions for program modules may be executed within local or distributed devices. In the latter case, program modules can be located both in local and remote storage medium.

As compared to the traditional blockchains, every block in the ledger maintained by the system of the present invention has its block head containing the index records of the previous block and the next block of the block. As used herein, an index record may be a block number and/or block a storage location. The index record can be of any configuration as long as it has the function of allowing a user to use a certain block to find the data of its previous block and next block. The index record does not participate in the hash computation.

Figure 2:
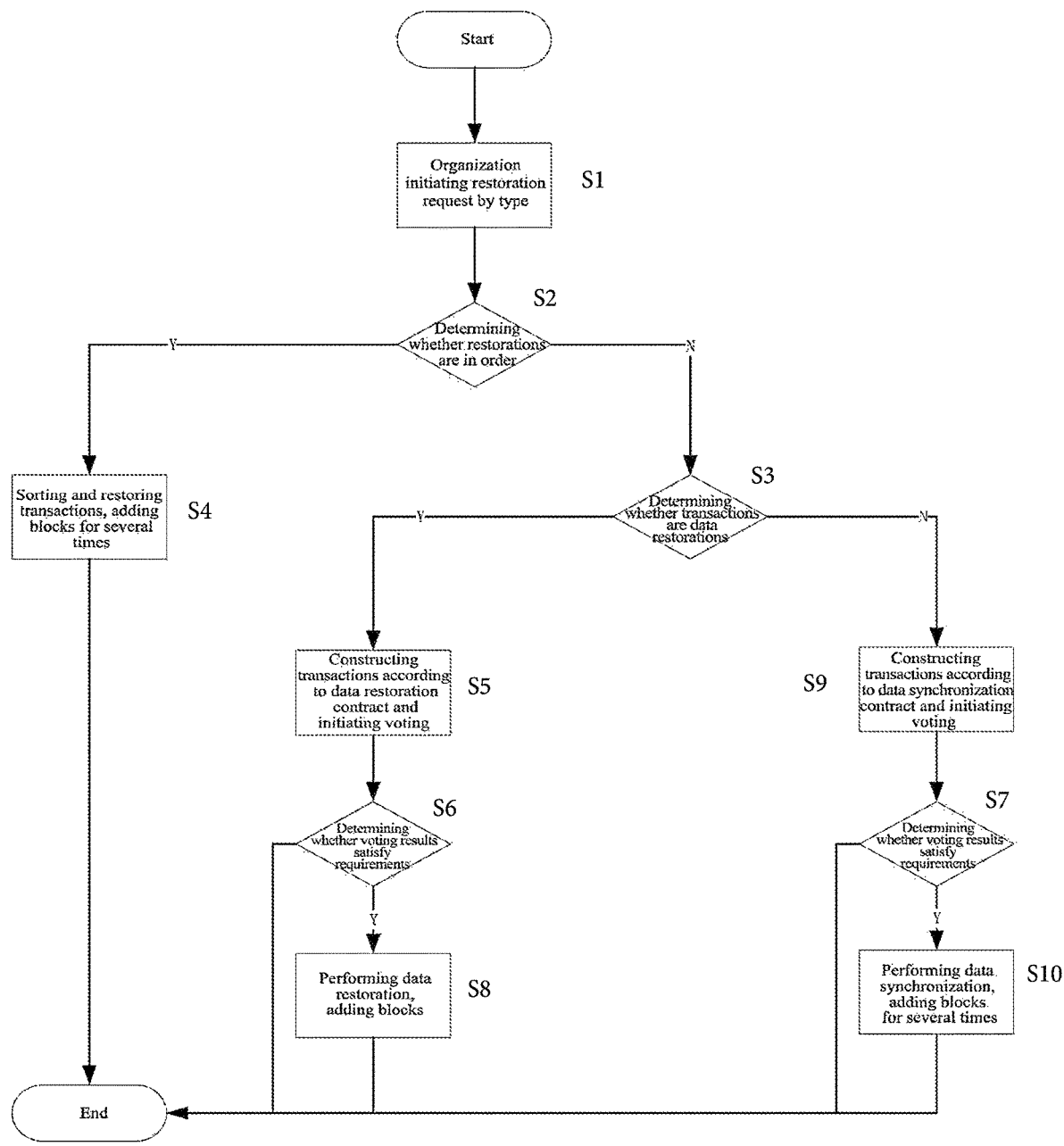
FIG. 2 is a schematic illustration showing the workflow of an on-chain data restoration method disclosed in the present invention.

In FIG. 2, the anti-trapdoor-leakage on-chain data restoration method proposed by the present invention at least includes steps S1 to S10. Although the on-chain data restoration method in embodiments of the present invention are depicted in a particular order, this should not be construed as requiring that such operations be performed in the particular order as shown or in a sequential order, or that all illustrated operations must be performed to achieve the desired result. In some cases, multitask or parallel processing may be beneficial. Likewise, although the above discussion contains some specific implementation details, these should not be construed as limits to the scope of invention or claims, but rather as descriptions about specific embodiments of specific inventions. Certain features in the aforesaid description that are described in different embodiments can also be implemented integrally in one single embodiment. Conversely, various features from each embodiment can also be implemented separately in multiple embodiments or in any suitable combination thereof At S1, an organization initiates transactions at a client by type.

As used herein, the term "type" refers to the type of the contract to be called. For example, if the on-chain restoration contract is to be called, the type referred is data of the type of on-chain restoration contracts. If a contract of another type is to be called, the data input should be set according to the requirements of the type of the required contract.

S2 is about determining whether the initiated transactions satisfy processing conditions for sorting and restoration. If the transactions satisfy the processing conditions for sorting and restoration, they are normal sorting and restoration tasks, and the method proceeds with step S4. Otherwise, the method proceeds with S3.

Depending on the contract called, different parameters have to be input and the results are different. The initiated transactions are determined as satisfying the processing conditions for sorting and restoration or not successively.

S3 is about determining whether the initiated transactions satisfy processing conditions for data restoration. If the transactions satisfy the processing conditions for data restoration, they are on-chain data restoration of an existing organization, so the method proceeds with step S5. Otherwise, the transactions are data synchronization for a new organization, and the method proceeds with the step S9.

As used herein, an existing organization refers to an organization that has been on the chain. Every organization new to the chain is a new organization. If some data of the organization have to interact with an existing organization, and the data need to be placed on the chain in order, data of the new organization are called for synchronization, thereby determining whether the transaction is about on-chain data restoration for an existing organization or about data synchronization for a new organization.

At S4, a client calls the corresponding processing contract according to the determination result. The desired data restoration is achieved through consensus reached through a multi-organization vote and insertion of new blocks.

Specifically, to call the sorting and restoration contract, search is conducted first for the corresponding transaction so as to acquire the tx_id. Then the corresponding blocks are searched to find out blocks with new backdoors generated by the corresponding proposer. Afterward, the order of intra-block transactions of the blocks with new backdoors generated by the corresponding proposer is modified.

Figure 3:
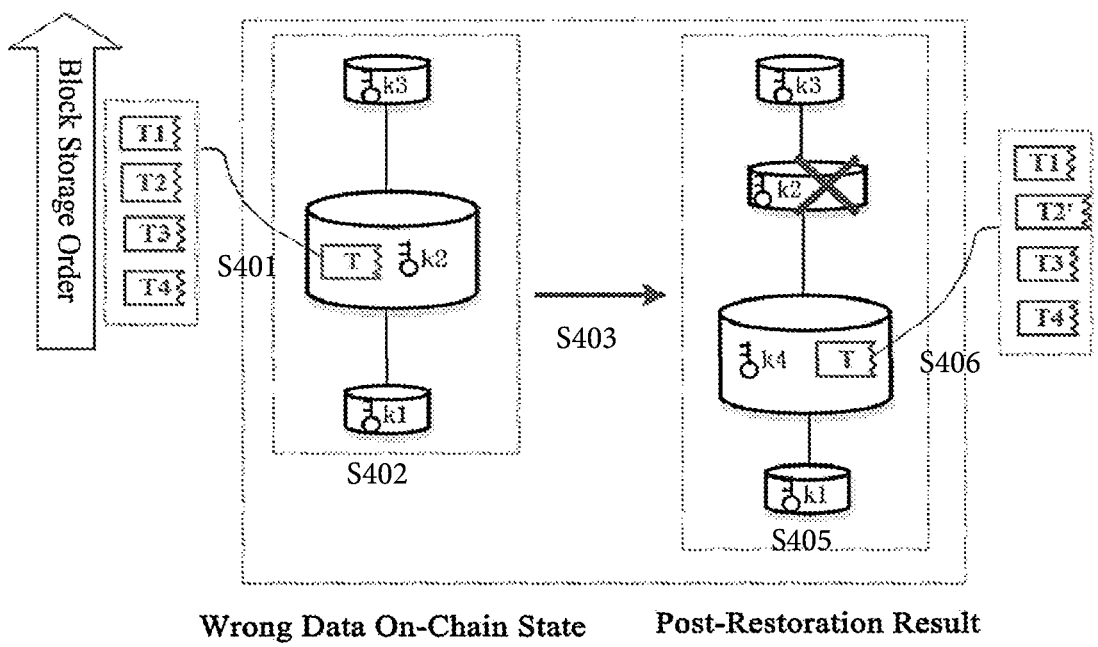
FIG. 3 is a schematic illustration showing the workflow for correcting data according to the on-chain data restoration method disclosed in the present invention.

In FIG. 3, the step S4 at least comprises steps S401 to S405.

S401 involves searching for tx_ids of transactions to be sorted.

With the searching function equipped in the blockchain system, the corresponding tx_ids can be found according to the transactions, and the corresponding blocks can be found according to the tx_ids.

S402 is about searching for the corresponding Block A according to the tx_id. At this time, the hash of its previous block is $H(a\|r_a)$.

At S403, the corresponding proposer h is found according to Block A.

At S404, a new Block B is generated from the proposer h. The backdoor of Block B and the backdoor of Block A are different. Block B inherits all transactions of Block A and has the transactions sorted in order. At this time, the hash of Block B is b.

Through the key generating function/key exporting function required computation of the Chameleon-Hash function, every block will generate a corresponding backdoor, so that the backdoor of Block B and the backdoor of Block A are different.

The description "Block B inherits all transactions of Block A and has the transactions sorted in order" refers to the operation of reproducing all transactions in A, sorting the transactions in order, and generating Block B. This process means that the data of A are inherited by B.

At S405, the proposer h finds out $H(b\|r_b)$ that has the same hash value as $H(a\|r_a)$ according to the backdoor of Block A through computation. Then it inserts Block B before Block A and marks Block A as invalid.

Therein, $H(b\|r_b)$ means the operation of computing b and $r_b$ together to computation using the hash function through concatenation.

In order to make old block (Block A) invalid after the addition of the new block (Block B), preferably, a flag is added to the block head of the old block (Block A). The flag value of 1 means that the block is invalid, and the value of 0 means that data of the block are valid. The data in Block A that has been marked as invalid as described in the foregoing process are not encrypted, so the original is directly visible. As a preferred implementation, the process to make the old block (Block A) invalid may be replaced by using AES (Advanced Encryption Standard), wherein the block is encrypted and then stored in the ledger, and the AES key is put under the custody of the proposer or a trustable third party. Alternatively, for the same purpose, secret sharing based on the threshold signature scheme may be used for custody. The data of Block A marked as invalid are then processed through AES symmetric encryption, so that no one except for the person modifying the data can see the data of the block prior to the modification.

S406 involves updating the block head of Block A during insertion of Block B.

The process of updating the block head of Block A at least comprises updating the index records about the block previous to Block A contained in the block head and/or updating the random number of the hash computation of the previous block in the block head of Block A. For easy understanding, the hash of the block previous to Block A is Chameleon-Hash$_{(g)}$ (a, $r_a$), for example. In the block head of Block A, a and $r_a$ are stored, as well as the set g of some other parameter for Chameleon-Hash computation. During insertion of the new block, the block head of Block A is updated, in which a, $r_a$ and the parameter set g are updated to b, $r_b$ and the parameter set g, and at this time Chameleon-Hash$_{(g)}$ (b, $r_b$)=Chameleon-Hash$_{(g)}$ (a, $r_a$). The transaction data in the old Block A and the hash values corresponding to the transaction data remain unchanged. The hash values of the block previous to Block A also remain unchanged after computation of the Chameleon-Hash function. Thus, Block A can still work as a cohesive chain, and the only difference is that Block A is marked as invalid and its transactions are hidden from the user end. For preventing repetition, the same operation when referred to in the following description will be omitted.

In every modification, after a block is added, the old block still exists in the underlying ledger, and is recoverable. Therefore, with the system and the method of the present invention, the operation of modifying a block can be supervised and audited, and is superior to the existing solutions without the ability to restore data in terms of practicality.

In the known solutions, the use of the Chameleon-Hash function is to enable modification of transaction data in the present block, but the present invention uses the Chameleon-Hash function to enable modification of the hash of the previous block recorded in the present block. For easy understanding, in one example, the hash of the block previous to Block A2, namely the hash of Block A1, is computed form Hash a0 of Block A0 and the block body hash of Block A1. Assuming that, for Block A0, Chameleon-Hash$_{(g)}$ (a0, r$_a$)=Cham_A0, in the present invention, the hash value for computation of Block A1 is computed form Cham_A0 and the block body hash of Block A1.

At S5, the client calls the relevant processing contract according to the determination result. According to the data restoration contract, transactions are constructed. Then the client initiates a voting round. Multiple organizations vote through clients. The client calls the voting contract to get statistic of the voting results.

As used herein, "constructing transactions" refers to construct a data set that can be recognized by the underlying functional functions of a node according to input delivered to the contract. Then the underlying functional functions of the node can perform relevant operations according to this data set.

S6 is about determining whether the initiated transaction satisfy preset conditions for the voting according to the statistics of voting. If the preset conditions for voting are satisfied, the method proceeds with step S8. Otherwise, the method ends here.

In the present invention, the preset conditions for different transactions may vary. In one example, approval of three of six voting parties by voting can confirm the operation they vote for.

S8 involves calling the contract for data restoration. The procedures include searching for the corresponding transaction and acquire tx_id first, and then finding out the block corresponding to the tx_id. Afterward, the corresponding proposer can be found and generates a block having a new backdoor, so the information of intrablock transactions can be modified accordingly.

Figure 4:
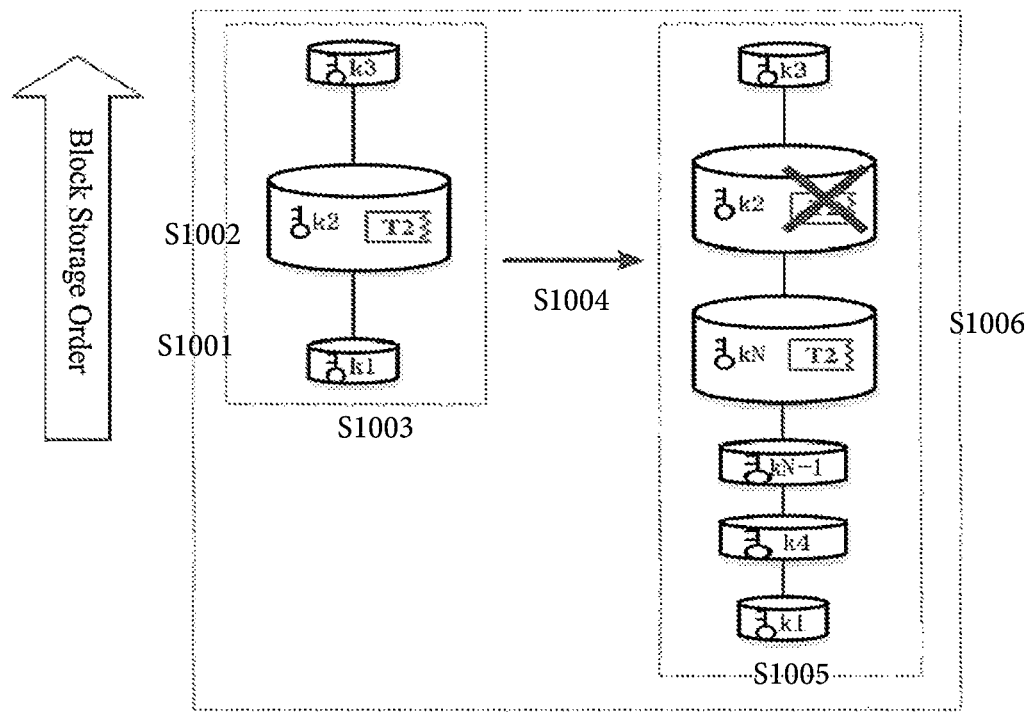
FIG. 4 is a schematic illustration showing the workflow for synchronizing data according to the on-chain data restoration method disclosed in the present invention.

In FIG. 4, the step S8 specifically comprises steps S801 to S805.

S801 is about searching for tx_id of the transaction to be restored.

S802 is about searching for corresponding Block A according to the tx_id. At this time, the hash of the previous block is H(a||r$_a$).

S803 is about searching for the corresponding proposer h according to Block A.

At S804, the proposer h generates Block B that has a backdoor different from that of Block A. B inherits all data of A, in which the transaction to be restored has been restored. At this time, the block hash of B is b.

Transaction information to be modified and the basis of restoration of information of intrablock transaction are determined according to the input made by the organization for calling the modification contract.

At S805, the proposer h figures out H(b||r$_b$) that has the same hash value as H(a||r$_a$) according to the backdoor of A. Accordingly, Block B is inserted before Block A and Block A is marked as invalid.

S806 is about updating the block head of Block A during insertion of Block B.

At S7, according to the statistic result of voting, whether the initiated transaction satisfies the preset conditions for voting is determined. If the preset conditions are satisfied, the method proceeds with step S10. Otherwise, the method ends here.

At S10, the contact for data synchronization is called. The procedures include searching for the corresponding transaction and acquire tx_id first, and then finding out the block corresponding to the tx_id. Afterward, the corresponding proposer can be found and generates a block having a new backdoor, so the information of intrablock transactions can be modified accordingly.

Figure 5:
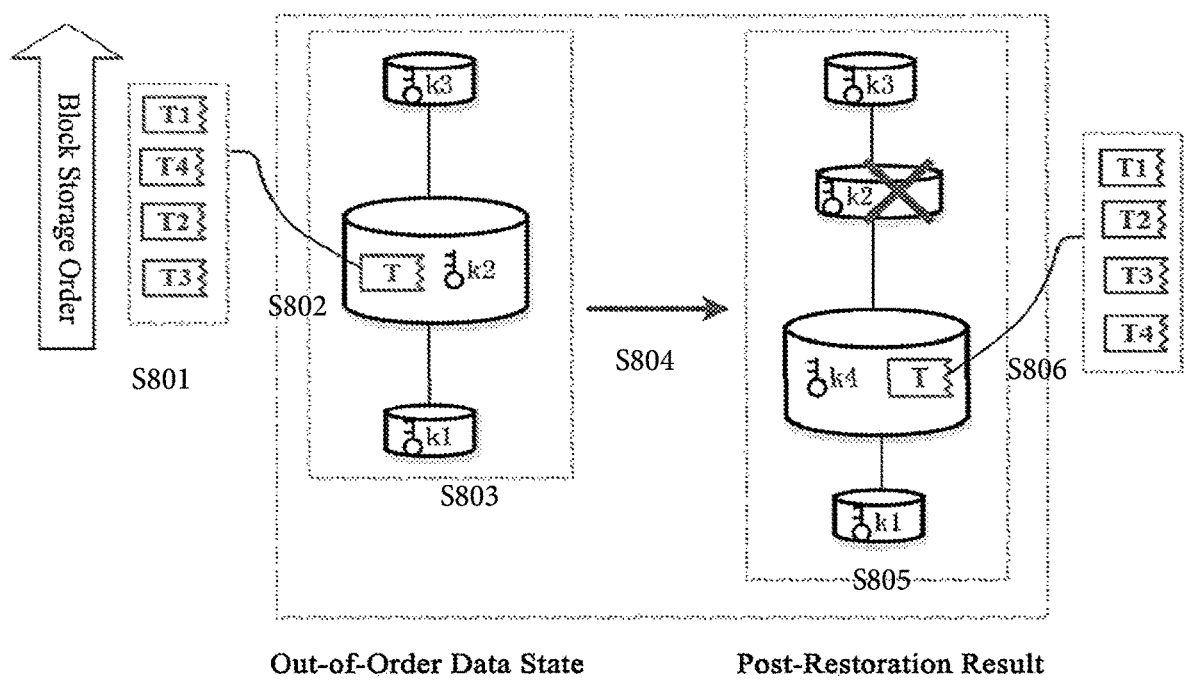
FIG. 5 is a schematic illustration showing the workflow for ordering out-of-order transactions according to the on-chain data restoration method disclosed in the present invention.

In FIG. 5, the step S10 specifically comprises steps S1001 to S1005.

At S1001, the new organization searches for tx_id according to the transaction t1 to be synchronized.

Herein, the transaction t1 to be synchronized is the transaction initiated by the new organization.

At S1002, the client searches for Block A corresponding to the tx_id. At this time, the hash of the previous block in Block A is H(a||r$_a$).

At S1003, the client searches for a proposer h corresponding to Block A.

At S1004, the proposer h generates Blocks B, C . . . N. Each of Blocks B, C . . . N has a backdoor different from that of Block A, and the backdoors of Blocks B, C . . . N are different from each other. Block B inherits all data of Block A. At this time, the block hash of Block B is b.

At S1005, the proposer h performs computation according to the backdoor of A and figure out H(b||r$_b$). H(b||r$_b$) and H(a||r$_a$) have the same hash value. Then blocks N . . . C, B are inserted before Block A and Block A is marked as invalid. Assuming that the original order of the blocks is 1, A, 3, the order after Block B, C . . . N are inserted is 1, N . . . C, B, A, 3. The transaction data within B are completely the same as the data in A except for the backdoor.

S1006 is about updating the block head of Block A during insertion of Block B.

It should be noted that the above-mentioned specific embodiments are exemplary, and those skilled in the art can come up with various solutions inspired by the disclosure of the present invention, and those solutions also fall within the disclosure scope as well as the protection scope of the present invention. It should be understood by those skilled in the art that the description of the present invention and the accompanying drawings are illustrative rather than limiting to the claims. The protection scope of the present invention is defined by the claims and their equivalents. The description of the present invention contains a number of inventive concepts, such as "preferably", "according to a preferred embodiment" or "optionally" all indicate that the corresponding paragraph discloses an independent idea, and the applicant reserves the right to file a divisional application based on each of the inventive concepts. In the whole text, the features introduced by "preferably" are only an alternative, and should not be construed as a mandatory configuration, so the applicant reserves the right to abandon or delete the relevant preferred features at any time.

What is claimed is:

1. An anti-trapdoor-leakage on-chain data restoration method, at least comprising:
   broadcasting transaction data of a request-initiating person to blockchain nodes and proposer nodes in other groups by a blockchain node, respectively;
   performing computation of a Chameleon-Hash function by a proposer node using a key set that is generated by a key-generating module provided in the proposer node;
   packaging the transaction data to generate a new block by the proposer node;
   distributing the new block to all the blockchain nodes by the proposer node; and
   making the blockchain nodes update their respective underlying ledgers according to the new blocks broadcasted by the proposer;
   further comprising:

according to a type of the block, determining by the blockchain node whether a transaction initiated by a request-initiating person satisfies preset restoration conditions;

based on a determination result, calling a relevant processing contract by the blockchain node; and according to the processing contract, restoring or synchronizing the data by the blockchain node, based on consensus reached through a multi-organization vote and insertion of the new block;

further comprising:

forming an index of a replacement block by using the tx_id of the cross-domain transaction; and sorting old transactions of a new organization with the same index and inserting it into the existing blockchain;

wherein every said block in an underlying ledger that has been updated by the blockchain node has a block head including index records about a previous block and a next block with respect to that block, so as to enable the blockchain node to confirm data of the previous block and/or the next block with respect to that block through that block;

wherein the proposer node modifies a hash of the previous block recorded in the old block confirmed according to the transaction data, through the computation of a Chameleon-Hash function;

wherein after the computation of the Chameleon-Hash function, a hash of the previous block recorded in the old block remains unchanged, and the old block is marked as invalid but kept in the underlying ledger with its original capability of linking blockchains intact, after the blockchain node inserts the new block to the underlying ledger;

further comprising:

according to the called processing contract, searching for the relevant transaction so as to acquire a tx_id of the transaction;

based on the acquired tx_id, searching for the relevant old block; and searching for the proposer node relevant to the old block and make the proposer node generate the new block.

2. The on-chain data restoration method of claim 1, wherein a trapdoor key corresponding to the new block generated by the proposer node is different from a trapdoor key of the old block identified by the tx_id of the transaction.

3. The on-chain data restoration method of claim 2, wherein the blockchain node or the client determines whether the transaction initiated by the request-initiating person satisfies the preset restoration conditions according to the block type;

the corresponding processing contract is called based on the determination result;

according to the processing contract, the consensus reached through a multi-organization vote is passed; and an instruction is generated based on the result of consensus reached through a multi-organization vote.

* * * * *